US012569940B2

(12) United States Patent  
Shimazaki et al.

(10) Patent No.: US 12,569,940 B2  
(45) Date of Patent: Mar. 10, 2026

(54) SOLDER ALLOY, JOINT PORTION, JOINING MATERIAL, SOLDER PASTE, JOINT STRUCTURE, AND ELECTRONIC CONTROL DEVICE

(71) Applicant: TAMURA CORPORATION, Tokyo (JP)

(72) Inventors: Takanori Shimazaki, Iruma (JP); Daisuke Maruyama, Iruma (JP); Genki Ochi, Iruma (JP); Masaya Arai, Iruma (JP)

(73) Assignee: TAMURA CORPORATION, Tokyo (JP)

( * ) Notice: Subject to any disclaimer, the term of this patent is extended or adjusted under 35 U.S.C. 154(b) by 378 days.

(21) Appl. No.: 18/342,733

(22) Filed: Jun. 28, 2023

(65) Prior Publication Data

US 2024/0066638 A1 Feb. 29, 2024

Related U.S. Application Data

(63) Continuation of application No. PCT/JP2022/031965, filed on Aug. 24, 2022.

(51) Int. Cl.  
*B23K 35/26* (2006.01)  
*B23K 35/02* (2006.01)  
*C22C 12/00* (2006.01)  
*C22C 13/02* (2006.01)

(52) U.S. Cl.  
CPC .......... *B23K 35/262* (2013.01); *B23K 35/025* (2013.01); *B23K 35/264* (2013.01); *C22C 12/00* (2013.01); *C22C 13/02* (2013.01)

(58) Field of Classification Search  
CPC .. B23K 35/262; B23K 35/025; B23K 35/264; B23K 35/0244; B23K 35/26; C22C 12/00; C22C 13/02; C22C 13/00  
See application file for complete search history.

(56) References Cited

U.S. PATENT DOCUMENTS

| | | | |
|---|---|---|---|
| 2015/0196978 A1* | 7/2015 | Iseki | B23K 35/3013 428/141 |
| 2020/0070287 A1 | 3/2020 | Mutuku et al. | |
| 2020/0123634 A1 | 4/2020 | Zhang et al. | |
| 2021/0001431 A1 | 1/2021 | Yokoyama et al. | |

FOREIGN PATENT DOCUMENTS

| | | |
|---|---|---|
| CN | 107984110 | 5/2018 |
| CN | 108546846 | 9/2018 |
| JP | 6477965 B1 | 3/2019 |
| JP | 2019-527145 | 9/2019 |
| JP | 6804126 B1 | 12/2020 |
| JP | 6951438 B2 | 10/2021 |

(Continued)

OTHER PUBLICATIONS

PL-233781-B1: Google Patents machine translation (Year: 2019).*

(Continued)

*Primary Examiner* — Adil A. Siddiqui  
(74) *Attorney, Agent, or Firm* — MORI & WARD, LLP

(57) ABSTRACT

A solder alloy includes 45 mass % or more and 63 mass % or less of Bi, 0.1 mass % or more and less than 0.7 mass % of Sb, 0.05 mass % or more and 1 mass % or less of In, and a balance including Sn.

15 Claims, 1 Drawing Sheet

(56) References Cited

FOREIGN PATENT DOCUMENTS

| | | | | |
|---|---|---|---|---|
| PL | 233781 B1 | * | 11/2019 | |
| WO | WO 2019/171710 | | 9/2019 | |

OTHER PUBLICATIONS

Japanese Office Action for corresponding JP Application No. 2022-551546, Oct. 18, 2022 (w/ machine translation).
International Search Report for corresponding International Application No. PCT/JP2022/031965, Oct. 25, 2022.
Written Opinion for corresponding International Application No. PCT/JP2022/031965, Oct. 25, 2022.
Translation of International Search Report for corresponding International Application No. PCT/JP2022/031965, Oct. 25, 2022.
Translation of Written Opinion of the International Searching Authority for corresponding International Application No. PCT/JP2022/031965, Oct. 25, 2022.

* cited by examiner

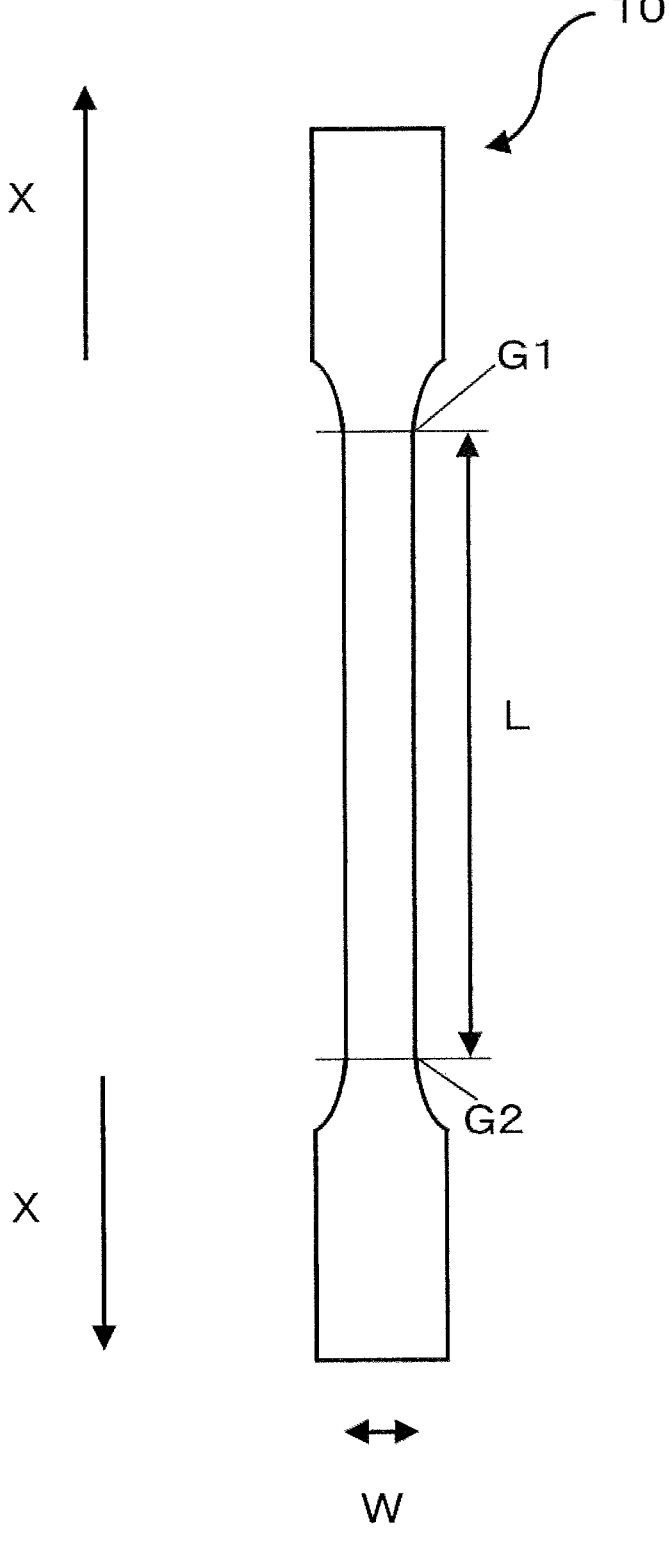

SOLDER ALLOY, JOINT PORTION, JOINING MATERIAL, SOLDER PASTE, JOINT STRUCTURE, AND ELECTRONIC CONTROL DEVICE

CROSS-REFERENCE TO RELATED APPLICATIONS

The present application is a continuation application of International Application No. PCT/JP2022/031965, filed Aug. 24, 2022. The contents of this application are incorporated herein by reference in their entirety.

BACKGROUND

Technical Field

The present invention relates to a solder alloy, a joint portion, a joining material, a solder paste, a joint structure, and an electronic control device.

Background Art

Solder alloys are widely known as a material for joining (soldering) joining target materials (for example, a printed wiring board and an electronic component).

The temperature condition (heating temperature) at the time of soldering is set based on the melting temperature (in the present specification, "melting point" or "liquidus temperature" is meant). Therefore, the heating temperature is set to be high depending on the liquidus temperature of the solder alloy. In this case, the reliability of the joint structure (joining target materials which have been joined to each other, for example, a printed circuit board) may be decreased by thermal load to be applied to the joining target materials. Therefore, there is provided a solder alloy in which Bi is added to lower the liquidus temperature so that the heating temperature can be set low.

However, Bi has a property of reducing the ductility of the solder alloy, and thus a joint portion formed using a solder alloy containing Bi tends to be hard and brittle.

Therefore, for example, the following solder alloy is provided as a solder alloy that contains Bi and has improved ductility and brittleness.

A lead-free solder alloy containing 32 mass % or more and 40 mass % or less of Bi, 0.1 mass % or more and 1.0 mass % or less of Sb, 0.1 mass % or more and 1.0 mass % or less of Cu, 0.001 mass % or more and 0.1 mass % or less of Ni, with the balance being Sn and inevitable impurities (Patent Literature 1).

A solder alloy having an alloy composition of Bi: 35 to 68%, Sb: 0.1 to 2.0%, Ni: 0.01 to 0.10%, and the balance Sn, in terms of mass % (Patent Literature 2).

A SnBiSb-based low-temperature lead-free solder containing, in terms of mass %, 32.8 to 56.5% of Bi, 0.7 to 2.2% of Sb, and the balance Sn, wherein the mass % of Bi and Sb satisfies the relational expression $b=0.006a^2-0.672a+19.61+c$, where a represents the mass % of Bi, b represents the mass % of Sb, the value range of c is $-1.85 \leq c \leq 1.85$, and the lead-free solder further contains one or two or more metal elements of 0.01 to 2.5% of Ce, 0.05 to 2.0% of Ti, 0.5 to 0.8% of Ag, and 0.05 to 1% of In in terms of mass % (Patent Literature 3).

PATENT LITERATURE

Patent Literature 1: JP 6804126 B
Patent Literature 2: JP 6477965 B

Patent Literature 3: JP 6951438 B

SUMMARY OF THE INVENTION

According to one aspect of the present invention, a solder alloy includes 45 mass % or more and 63 mass % or less of Bi, 0.1 mass % or more and less than 0.7 mass % of Sb, 0.05 mass % or more and 1 mass % or less of In, and a balance including Sn.

According to another aspect of the present invention, a joining material includes a solder alloy. The solder alloy includes 45 mass % or more and 63 mass % or less of Bi, 0.1 mass % or more and less than 0.7 mass % of Sb, 0.05 mass % or more and 1 mass % or less of In, and a balance including Sn.

According to the other aspect of the present invention, a solder paste includes a flux, and a powder made of a solder alloy. The solder alloy includes 45 mass % or more and 63 mass % or less of Bi, 0.1 mass % or more and less than 0.7 mass % of Sb, 0.05 mass % or more and 1 mass % or less of In, and a balance including Sn.

According to further aspect of the present invention, a joint portion is formed using the solder alloy discussed above.

According to the other aspect of the present invention, a joint structure includes a first joining target material, a second joining target material, and a joint portion formed using the solder alloy discussed above to join the first joining target material and the second joining target material.

According to the other aspect of the present invention, an electronic control device includes a joint structure. The joint structure includes a first joining target material, a second joining target material, and a joint portion formed using the solder alloy discussed above to join the first joining target material and the second joining target material.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 1 is a plan view illustrating a shape of a test piece used in the section (1) tensile test.

DESCRIPTION OF THE EMBODIMENTS

Hereinafter, embodiments of the present invention will be described. Note that the present invention is not limited to the following embodiments.

Depending on the type of electronic device, the joint structure may be placed in an environment in which a heat cycle is repeated, and this heat cycle causes thermal fatigue fracture (cracking) of the joint portion. As described above, the joint portion formed using the solder alloy containing Bi tends to be hard and brittle, so that the cracking tends to occur.

In addition, there is a case where an instantaneous and intensive strong external force acts on the joining target material or the joint portion due to falling of the electronic device onto the ground or the like. In order to prevent breakage of the joint portion due to the external force, it is required to improve the strength and ductility of the joint portion in a well-balanced manner. However, as described above, since a solder alloy containing Bi has low ductility, a joint portion formed using such a solder alloy is likely to be damaged by the action of the external force.

Therefore, an object of the present embodiments is to provide a solder alloy, a joining material, and a solder paste capable of forming a joint portion having heat cycle resistance and drop impact resistance while containing Bi.

1. Solder Alloy

The solder alloy of the present embodiment contains 45 mass % or more and 63 mass % or less of Bi, 0.1 mass % or more and less than 0.7 mass % of Sb, and 0.05 mass % or more and 1 mass % or less of In, with the balance being Sn and inevitable impurities.

When the solder alloy of the present embodiment contains predetermined amounts of Bi, Sb, In, and Sn, it is possible to strengthen the joint portion by solid solution of Bi, Sb, and In in Sn as well as strengthen the joint portion by precipitation and dispersion of fine intermetallic compounds (i.e., $\beta$-SnSb, InSb), and to impart good ductility to the joint portion while lowering the liquidus temperature.

Therefore, the solder alloy of the present embodiment can suppress generation of cracks in the joint portion due to residual stress generated in the joint portion at the time of solidification of the solder in the soldering process and due to strain generated in the printed wiring board in the production of the electronic control device and the electronic device.

In addition, with the above configuration, the solder alloy of the present embodiment can suppress generation of cracks and development of cracks in the joint portion due to repetition of heat cycles.

Incidentally, as described above, when the electronic device is dropped, an instantaneous and intensive strong external force (hereinafter, simply referred to as "external force") acts on the joint portion. The external force acts on the joint portion from a plurality of directions (at least two of tension, compression, shear, bending, and torsion). Thus, a large stress and a stress in response to the external force are instantaneously generated in the joint portion. Therefore, in order to prevent breakage of the joint portion due to the external force, it is required that the joint portion has good strength and good ductility, that is, the yield stress, the tensile stress, and the strain at break of the joint portion are improved in a well-balanced manner.

As such, the solder alloy of the present embodiment can form a joint portion having good strength and ductility in a well-balanced manner by the above configuration, and thus can provide a joint portion having good resistance to the external force, that is, good drop impact resistance.

The solder alloy of the present embodiment can impart good strength and ductility to the joint portion by the above configuration even if the solder alloy does not contain an alloy element such as Ni or Co that precipitates the fine intermetallic compound in the joint portion.

(1) Bi

When the solder alloy of the present embodiment contains 45 mass % or more and 63 mass % or less of Bi, favorable strength and ductility can be imparted to the joint portion while lowering the liquidus temperature.

On the other hand, when the content of Bi is out of the above range, the liquidus temperature of the solder alloy may greatly increase. In addition, when the content of Bi exceeds 63 mass %, there is a possibility that the ductility of the solder alloy decreases.

The content of Bi is preferably 45 mass % or more and 60 mass % or less. The content of Bi is more preferably 50 mass % or more and 59 mass % or less. When the content of Bi is in this range, the ductility of the solder alloy can be further improved, and the heat cycle resistance and the drop impact resistance of the joint portion can be further improved.

(2) Sb

When the solder alloy of the present embodiment contains 0.1 mass % or more and less than 0.7 mass % of Sb, it is possible to strengthen the joint portion and also improve the ductility. Further, the liquidus temperature of the solder alloy can also be lowered.

On the other hand, when the content of Sb is less than 0.1 mass %, the strengthening of the joint portion may be insufficient. In addition, when the content of Sb is 0.7 mass % or more, coarse $\beta$-SnSb is crystallized as primary crystals, so that the ductility of the joint portion may be inhibited.

The content of Sb is preferably 0.2 mass % or more and less than 0.7 mass %. The content of Sb is more preferably 0.3 mass % or more and 0.6 mass % or less. When the content of Sb is in this range, it is possible to further improve the ductility and strength of the solder alloy, and further improve the heat cycle resistance and the drop impact resistance of the joint portion.

(3) In

When the solder alloy of the present embodiment contains 0.05 mass % or more and 1 mass % or less of In, the joint portion is strengthened, and ductility can be improved. Further, the liquidus temperature of the solder alloy can also be lowered.

On the other hand, when the content of In is less than 0.05 mass %, strengthening of the joint portion due to precipitation may be insufficient. In addition, when the content of In is more than 1 mass %, InSb is coarsened, so that the ductility of the joint portion may be inhibited.

The content of In is preferably 0.05 mass % or more and 0.5 mass % or less. The content of In is more preferably 0.05 mass % or more and 0.3 mass % or less. When the content of In is in this range, it is possible to further improve the ductility and strength of the solder alloy, and improve the heat cycle resistance and the drop impact resistance of the joint portion.

The solder alloy of the present embodiment can further contain one or more selected from P, Ga, and Ge in a total amount of 0.001 mass % or more and 0.05 mass % or less.

When one or more selected from P, Ga, and Ge are added to the solder alloy, oxidation of the solder alloy can be suppressed, and the wettability of the solder alloy can be improved, so that a highly reliable joint portion can be provided. On the other hand, when the total content of one or more selected from P, Ga, and Ge exceeds 0.05 mass %, voids are generated in the joint portion, and heat cycle resistance may be deteriorated.

The solder alloy of the present embodiment can further contain one or more selected from Mn, Ti, Al, Cr, V, and Mo in a total amount of 0.001 mass % or more and 0.05 mass % or less.

When one or more selected from Mn, Ti, Al, Cr, V, and Mo are added to the solder alloy, the intermetallic compound in the joint portion is further refined, so that development of cracks can be suppressed, and good heat cycle resistance can be realized. On the other hand, when the total content of one or more selected from Mn, Ti, Al, Cr, V, and Mo exceeds 0.05 mass %, voids are generated in the joint portion, and heat cycle resistance may be deteriorated.

The balance of the solder alloy of the present embodiment is composed of Sn and inevitable impurities. The solder alloy of the present embodiment does not contain lead other than inevitable impurities.

In addition, it is preferable that the solder alloy of the present embodiment satisfy the alloy composition and the content described above, and have a liquidus temperature of 170° C. or lower.

As described above, the heating temperature at the time of soldering is set based on the melting temperature of the solder alloy, and is generally higher than or equal to the melting temperature+20° C. It is said that when the heating temperature is lowered to 190° C., occurrence of deformation (warpage) due to a thermal load in a joining target material, particularly a printed wiring board or an electronic component can be significantly reduced.

When the liquidus temperature of the solder alloy is 170° C. or lower, the solder alloy can be sufficiently melted even when soldering is performed at a heating temperature of 190° C. Therefore, in this case, it is possible to suppress deformation of the printed wiring board and the electronic component due to the thermal load, particularly, deformation of the printed wiring board and the electronic component which are downsized and thinned, and to suppress occurrence of joining failure between the joining target portion and the joint portion caused by the deformation. In addition, since the occurrence of unmolten solder can be suppressed, a highly reliable joint portion can be provided.

The liquidus temperature of the solder alloy described above is measured in accordance with JIS Z3198-1: 2014, according to the differential scanning calorimetry method, at a rate of temperature rise of 2° C./min and a sample amount of 10 mg.

2. Joining Material

The joining material of the present embodiment contains the solder alloy of the present embodiment, and can be used in the form of a solder paste, a solder ball, a wire, a solder preform, a flux-cored solder, or the like described later.

The form of the joining material can be appropriately selected according to the size, type, and use of the joining target material to be joined, a solder joining method, and the like.

Since the joining material of the present embodiment contains the solder alloy of the present embodiment, a joint portion having good heat cycle resistance and drop impact resistance can be formed.

3. Solder Paste

The solder paste of the present embodiment contains a powder made of the solder alloy of the present embodiment (hereinafter, referred to as "alloy powder"), and is prepared, for example, by kneading the alloy powder and a flux to form a paste.

<Flux>

The flux contains, for example, a base resin, a thixotropic agent, an activator, and a solvent.

Examples of the base resin include a rosin-based resin; an acrylic resin obtained by polymerizing at least one monomer of acrylic acid, methacrylic acid, various esters of acrylic acid, various esters of methacrylic acid, crotonic acid, itaconic acid, maleic acid, maleic anhydride, esters of maleic acid, esters of maleic anhydride, acrylonitrile, methacrylonitrile, acrylamide, methacrylamide, vinyl chloride, or vinyl acetate; an epoxy resin; and a phenol resin. These can be used singly or in combination of two or more.

Examples of the thixotropic agent include hardened castor oil, hydrogenated castor oil, bisamide-based thixotropic agents (saturated fatty acid bisamide, unsaturated fatty acid bisamide, aromatic bisamide, and the like), oxyfatty acids, and dimethyldibenzylidene sorbitol. These can be used singly or in combination of two or more.

Examples of the activator include organic acids (mono-carboxylic acids, dicarboxylic acids, and other organic acids), halogen-containing compounds, and amine-based activators. These can be used singly or in combination of two or more. Examples of the solvent include alcohol solvents, butyl cellosolve solvents, glycol ether solvents, and ester solvents. These can be used singly or in combination of two or more.

The flux may contain an antioxidant. Examples of the antioxidant include hindered phenol-based antioxidants, phenol-based antioxidants, bisphenol-based antioxidants, and polymer-type antioxidants.

An additive such as a matting agent or an antifoaming agent may be further added to the flux.

When the solder paste of the present embodiment is prepared, the blend ratio (mass %) of the alloy powder to the flux can be 65:35 to 95:5. The blend ratio may be, for example, 85:15 to 93:7 or 87:13 to 92:8.

The particle size of the alloy powder may be 1 μm or more and 40 μm or less. The particle size may be 5 μm or more and 35 μm or less, or 10 μm or more and 30 μm or less.

Since the solder paste of the present embodiment contains the alloy powder, a joint portion having good heat cycle resistance and drop impact resistance can be formed.

4. Joint Portion

The joint portion of the present embodiment is formed using the solder alloy and the joining material (including solder paste) of the present embodiment, and joins the joining target materials.

The method for forming the joint portion of the present embodiment may be any method as long as the joint portion can be formed using the solder alloy, the joining material, and the solder paste of the present embodiment, and any method such as a reflow method and a flow method can be adopted. In addition, the joining material to be used can also be appropriately selected according to the size, type, and application of the joining target material to be joined, the forming method, and the like.

5. Joint Structure

The joint structure according to the present embodiment includes a first joining target material, a joint portion, and a second joining target material. The joint portion is the joint portion of the present embodiment, and joins the first joining target material and the second joining target material.

Examples of the combination of the first joining target material and the second joining target material include two or more selected from a substrate (a substrate whose surface is made of any of a ceramic, a metal, an alloy, and a resin, and on which no electronic circuit is formed), a printed wiring board (a substrate on which an electronic circuit is formed and an electronic component or the like is not mounted), a printed circuit board (a printed wiring board on which an electronic component or the like is mounted), an electronic component, a silicon wafer, a semiconductor package, and a semiconductor chip.

Specific examples of the combination include a printed wiring board and an electronic component, a printed wiring board and a semiconductor chip, a semiconductor package and a printed circuit board, and a printed wiring board and a printed wiring board.

In addition, the joint structure of the present embodiment is produced, for example, by the following method.

When a printed wiring board is used as the first joining target material and an electronic component is used as the second joining target material, first, the joining material of the present embodiment is placed (in the case of solder paste, the joining material is applied) at a predetermined position of the first joining target material, for example, on an electronic circuit, and the second joining target material is placed on the joining material. Then, these are reflowed at a predetermined heating temperature, for example, a peak temperature of 190° C. to form a joint portion for joining the first joining target material and the second joining target material. Thus, the joint structure (printed circuit board) of the present embodiment is produced.

When a solder preform is used as the joining material, the solder preform having a surface coated with flux is placed at a predetermined position of the first joining target material, the second joining target material is then placed on the solder preform, and heating is performed.

When an electronic component including solder balls, such as a Ball Grid Array (BGA), is used as the second joining target material, a solder paste is applied to the surface of the BGA or a predetermined position of the first joining target material, the second joining target material is then placed on the predetermined position of the first joining target material, and heating is performed.

Since the joint structure of the present embodiment has the joint portion of the present embodiment, good heat cycle resistance and drop impact resistance can be realized.

6. Electronic Control Device

The electronic control device of the present embodiment includes the joint structure of the present embodiment. The electronic control device of the present embodiment is, for example, one in which a print circuit board including an electronic component and a printed wiring board which have been joined is disposed in a housing, and controls the operation of components constituting an electronic device.

The electronic control device of the present embodiment includes the joint structure of the present embodiment, and thus has good heat cycle resistance and drop impact resistance, and can ensure high reliability.

EXAMPLES

Hereinafter, the present invention will be described in detail with reference to Examples and Comparative Examples. Note that the present invention is not limited to these Examples.

TABLE 1

| | mass % | | | | |
| --- | --- | --- | --- | --- | --- |
| | Sn | Bi | Sb | In | Others |
| Example 1 | Balance | 45 | 0.4 | 0.1 | — |
| Example 2 | Balance | 50 | 0.4 | 0.1 | — |
| Example 3 | Balance | 54 | 0.4 | 0.1 | — |
| Example 4 | Balance | 58 | 0.4 | 0.1 | — |
| Example 5 | Balance | 59 | 0.4 | 0.1 | — |
| Example 6 | Balance | 60 | 0.4 | 0.1 | — |
| Example 7 | Balance | 63 | 0.4 | 0.1 | — |
| Example 8 | Balance | 54 | 0.1 | 0.1 | — |
| Example 9 | Balance | 54 | 0.2 | 0.1 | — |
| Example 10 | Balance | 54 | 0.3 | 0.1 | — |
| Example 11 | Balance | 54 | 0.6 | 0.1 | — |
| Example 12 | Balance | 54 | 0.65 | 0.1 | — |
| Example 13 | Balance | 54 | 0.4 | 0.05 | — |
| Example 14 | Balance | 54 | 0.4 | 0.2 | — |
| Example 15 | Balance | 54 | 0.4 | 0.3 | — |
| Example 16 | Balance | 54 | 0.4 | 0.5 | — |
| Example 17 | Balance | 54 | 0.4 | 1.0 | — |
| Example 18 | Balance | 45 | 0.1 | 0.05 | — |
| Example 19 | Balance | 63 | 0.65 | 1.0 | — |
| Example 20 | Balance | 54 | 0.4 | 0.1 | 0.05P |
| Example 21 | Balance | 54 | 0.4 | 0.1 | 0.05Ga |
| Example 22 | Balance | 54 | 0.4 | 0.1 | 0.05Ge |

8

TABLE 1-continued

| | mass % | | | | |
| --- | --- | --- | --- | --- | --- |
| | Sn | Bi | Sb | In | Others |
| Example 23 | Balance | 54 | 0.4 | 0.1 | 0.05Mn |
| Example 24 | Balance | 54 | 0.4 | 0.1 | 0.05Ti |
| Example 25 | Balance | 54 | 0.4 | 0.1 | 0.05Al |
| Example 26 | Balance | 54 | 0.4 | 0.1 | 0.05Cr |
| Example 27 | Balance | 54 | 0.4 | 0.1 | 0.05V |
| Example 28 | Balance | 54 | 0.4 | 0.1 | 0.05Mo |

TABLE 2

| | mass % | | | | |
| --- | --- | --- | --- | --- | --- |
| | Sn | Bi | Sb | In | Others |
| Comparative Example 1 | Balance | 58 | — | — | — |
| Comparative Example 2 | Balance | 40 | 0.4 | 0.1 | — |
| Comparative Example 3 | Balance | 65 | 0.4 | 0.1 | — |
| Comparative Example 4 | Balance | 54 | — | 0.1 | — |
| Comparative Example 5 | Balance | 54 | 0.05 | 0.1 | — |
| Comparative Example 6 | Balance | 54 | 0.7 | 0.1 | — |
| Comparative Example 7 | Balance | 54 | 0.4 | — | — |
| Comparative Example 8 | Balance | 54 | 0.4 | 1.5 | — |
| Comparative Example 9 | Balance | 54 | 0.4 | 0.1 | 0.1P |
| Comparative Example 10 | Balance | 54 | 0.4 | 0.1 | 0.1Ga |
| Comparative Example 11 | Balance | 54 | 0.4 | 0.1 | 0.1Ge |
| Comparative Example 12 | Balance | 54 | 0.4 | 0.1 | 0.1Mn |
| Comparative Example 13 | Balance | 54 | 0.4 | 0.1 | 0.1Ti |
| Comparative Example 14 | Balance | 54 | 0.4 | 0.1 | 0.1Al |
| Comparative Example 15 | Balance | 54 | 0.4 | 0.1 | 0.1Cr |
| Comparative Example 16 | Balance | 54 | 0.4 | 0.1 | 0.1V |
| Comparative Example 17 | Balance | 54 | 0.4 | 0.1 | 0.1Mo |

(1) Tensile Test

For each of the solder alloys shown in Tables 1 and 2, a test piece 10 as illustrated in FIG. 1 was prepared.

The test piece 10 was prepared so that the central parallel part (between G1 and G2 in FIG. 1) has the following dimensions.

Length of central parallel part (L in FIG. 1): 12 mm

Width of central parallel part (W in FIG. 1): 2 mm

Thickness of central parallel part: 4 mm

Then, the test piece 10 was subjected to a tensile test according to the following procedure.

The test piece 10 was pulled in the X direction at room temperature with a stroke of 0.72 mm/min until the test piece was broken using a table-top precision universal tester (product name: Autograph AG-50 kNX plus, manufactured by Shimadzu Corporation).

Then, the elongation of the test piece 10 was calculated based on the following equation, assuming that the stroke distance when the test piece 10 was broken was defined as GL1, and the length L of the central parallel part of the test piece 10 before pulling was defined as GL0.

$$\text{Elongation }(\%)=(GL1-GL0)/GL0\times100$$

Five test pieces 10 were prepared for one type of solder alloy, and the elongations and the average value of the elongations were calculated for each type of solder alloy according to the above procedure, and evaluated based on the following criteria. The results are shown in Tables 3 and 4.

⊙: The average value of elongation is 35% or more.

○: The average value of elongation is 30% or more and less than 35%.

Δ: The average value of elongation is 25% or more and less than 30%.

x: The average value of elongation is less than 25%.

(2) Drop Impact Test

A flux obtained by kneading the following components and each solder alloy powder (powder particle size: 20 μm to 38 μm) shown in Tables 1 and 2 were kneaded at the following blend ratio (mass %) to prepare solder pastes. The solder alloy powder was prepared by an atomization method.

Lead-free solder alloy powder:flux=89:11

<Composition of Flux>

Hydrogenated acid-modified rosin (product name: KE-604, manufactured by Arakawa Chemical Industries, Ltd.): 49 mass %

Activator (glutaric acid: 0.3 mass %, suberic acid: 2 mass %, malonic acid: 0.5 mass %, dodecanedioic acid: 2 mass %, dibromobutenediol: 2 mass %)

Fatty acid amide (product name: SLIPAX ZHH, manufactured by Nihon Kasei Co., Ltd.): 6 mass %

Diethylene glycol monohexyl ether: 35.2 mass %

Hindered phenol-based antioxidant (product name: Irganox 245, manufactured by BASF Japan Ltd.): 3 mass %

In addition, the following tools were prepared.

LGA (Land Grid Array, pitch width: 0.5 mm, size: length 12 mm×width 12 mm×thickness 1 mm, number of terminals: 228 pins)

Glass epoxy substrate (base material: FR-4, surface treatment: Cu-OSP, thickness: 1.0 mm, substrate having a pattern on which the LGA can be mounted)

Metal mask (thickness: 100 μm, corresponding to the above pattern)

For each solder paste, five glass epoxy substrates and 20 LGAs were used.

Then, each test substrate was prepared by the following procedure using the tool and each solder paste, and subjected to a drop impact test.

First, a solder paste was printed on a glass epoxy substrate using a metal mask. Then, four LGAs were placed at predetermined positions on the printed solder paste for each glass epoxy substrate. The printing film thickness of the solder paste was adjusted by the metal mask.

Then, the glass epoxy substrate on which the LGAs were placed was reflowed using a reflow furnace (product name: TNV-M6110CR, manufactured by TAMURA Corporation) to prepare a test substrate having the LGAs, the glass epoxy substrate, and a joint portion for joining them.

In the reflow, the preheating was performed at 100° C. to 120° C., the peak temperature was 185° C., the time at 150° C. or higher was 60 seconds, and the cooling rate from the peak temperature to 100° C. was 1° C. to 4° C./sec. The oxygen concentration was set to 200±100 ppm.

Next, the prepared test substrate was subjected to a drop impact test under the following conditions using a drop impact tester (product name: HDST-150J, Shinyei Technology Co., Ltd.).

That is, in accordance with JEDEC standard JESD22-B111, the test substrate was repeatedly freely dropped from a height at which an impact with a waveform of a pulse width of 0.5 ms and an acceleration of 1,500 G was loaded on the test substrate. During the drop impact test, the electric resistance of each joint portion of the test substrate was constantly observed. At the time at which the resistance value exceeded 1,000Ω, it was determined that the test substrate was broken, and the number of drops until the test substrate was broken was measured.

Five test substrates were prepared for each solder paste, and the measurement results were Weibull plotted for a total of 20 LGAs. The number of drops at which the cumulative failure rate is 63.2% was estimated as the characteristic life, and evaluation was performed according to the following criteria. The results are shown in Tables 3 and 4.

⊙: The characteristic life is 110 times or more.

○: The characteristic life is 90 times or more and less than 110 times.

Δ: The characteristic life is 70 times or more and less than 90 times.

x: The characteristic life is less than 70 times.

(3) Heat Cycle Test

The following tools were prepared.

Chip component (3.2 mm×1.6 mm)

Glass epoxy substrate (base material: FR-4, surface treatment: Cu-OSP, thickness: 1.2 mm, having a pattern on which the chip component can be mounted)

Metal mask (thickness: 120 μm, corresponding to the above pattern)

Three glass epoxy substrates and thirty chip components were used for each solder paste.

Then, each test substrate was prepared by the following procedure using the tool and each solder paste, and subjected to a heat cycle test.

First, a solder paste was printed on a glass epoxy substrate using a metal mask. Then, ten chip components were placed at predetermined positions on the printed solder paste for each glass epoxy substrate. The printing film thickness of the solder paste was adjusted by the metal mask.

Then, the glass epoxy substrate on which the chip components were placed was reflowed using a reflow furnace (product name: TNV-M6110CR, manufactured by TAMURA Corporation) to prepare a mounting substrate having the chip components, the glass epoxy substrate, and a joint portion for joining them.

In the reflow, the preheating was performed at 100° C. to 120° C., the peak temperature was 185° C., the time at 150° C. or higher was 60 seconds, and the cooling rate from the peak temperature to 100° C. was 1° C. to 4° C./sec. The oxygen concentration was set to 200±100 ppm.

Next, using a thermal shock tester (product name: ES-76LMS, manufactured by Hitachi Appliances, Inc.), each of the mounting substrates was exposed to the thermal shock cycle as follows under a set condition of 1 cycle from −40° C. (30 minutes) to 125° C. (30 minutes) to prepare test substrates a to c.

a: Test substrate exposed to an environment in which the above thermal shock cycle is repeated 2,000 cycles b: Test substrate exposed to an environment in which the above thermal shock cycle is repeated 2,250 cycles c: Test substrate exposed to an environment in which the above thermal shock cycle is repeated 2,500 cycles A target portion of was cut out from each of the test substrates a to c, and sealed with an epoxy resin (product name: HERZOG EPO, low-viscosity resin (main agent and curing agent), manufactured by Herzog Japan Co., Ltd.).

Then, the central cross section of each chip component mounted on each test substrate was made visible using a wet polishing machine (product name: TegraPol-25, manufactured by Marumoto Struers K.K.). The state of each joint portion on each of the test substrates a to c was observed with a scanning electron microscope (product name: TM-1000, manufactured by Hitachi High-Tech Corporation). The presence or absence of cracks completely crossing the joint portion was checked, and evaluation was performed according to the following criteria. The results are shown in Tables 3 and 4.

⊙: No crack completely crossing the joint portion was generated in all of the test substrates a to c.

○: No crack completely crossing the joint portion was generated in the test substrates a and b.

Δ: No crack completely crossing the joint portion was generated in the test substrate a.

x: Cracks completely crossing the joint portion were generated in all of the test substrates a to c.

(4) Liquidus Temperature Measurement

The liquidus temperature was measured for each solder alloy with a differential scanning calorimeter (product name: DSC Q2000, TA Instruments). The results are shown in Tables 3 and 4. Incidentally, the measurement condition (rate of temperature rise) of the liquidus temperature was set to 2° C./min, and the amount of the sample used for the measurement was set to 10 mg.

TABLE 3

|  | (1) Tensile test | (2) Drop impact test | (3) Heat cycle test | (4) Liquidus temperature measurement |
|---|---|---|---|---|
| Example 1 | ○ | ○ | ○ | 170° C. or lower |
| Example 2 | ⊙ | ⊙ | ○ | 170° C. or lower |
| Example 3 | ⊙ | ⊙ | ⊙ | 170° C. or lower |
| Example 4 | ⊙ | ⊙ | ○ | 170° C. or lower |
| Example 5 | ⊙ | ⊙ | ○ | 170° C. or lower |
| Example 6 | ○ | ○ | Δ | 170° C. or lower |
| Example 7 | Δ | Δ | Δ | 170° C. or lower |
| Example 8 | Δ | Δ | Δ | 170° C. or lower |
| Example 9 | ○ | ○ | ○ | 170° C. or lower |
| Example 10 | ⊙ | ⊙ | ○ | 170° C. or lower |
| Example 11 | ⊙ | ⊙ | ⊙ | 170° C. or lower |
| Example 12 | ○ | ○ | ⊙ | 170° C. or lower |
| Example 13 | ⊙ | ⊙ | ○ | 170° C. or lower |
| Example 14 | ⊙ | ⊙ | ○ | 170° C. or lower |
| Example 15 | ⊙ | ⊙ | ○ | 170° C. or lower |
| Example 16 | ○ | ○ | ⊙ | 170° C. or lower |
| Example 17 | Δ | Δ | ⊙ | 170° C. or lower |
| Example 18 | Δ | Δ | Δ | 170° C. or lower |
| Example 19 | Δ | Δ | ⊙ | 170° C. or lower |
| Example 20 | ⊙ | ⊙ | ⊙ | 170° C. or lower |
| Example 21 | ⊙ | ⊙ | ⊙ | 170° C. or lower |
| Example 22 | ⊙ | ⊙ | ⊙ | 170° C. or lower |
| Example 23 | ⊙ | ⊙ | ⊙ | 170° C. or lower |
| Example 24 | ⊙ | ⊙ | ⊙ | 170° C. or lower |
| Example 25 | ⊙ | ⊙ | ⊙ | 170° C. or lower |
| Example 26 | ⊙ | ⊙ | ⊙ | 170° C. or lower |
| Example 27 | ⊙ | ⊙ | ⊙ | 170° C. or lower |
| Example 28 | ⊙ | ⊙ | ⊙ | 170° C. or lower |

TABLE 4

|  | (1) Tensile test | (2) Drop impact test | (3) Heat cycle test | (4) Liquidus temperature measurement |
|---|---|---|---|---|
| Comparative Example 1 | X | X | X | 170° C. or lower |
| Comparative Example 2 | ○ | ○ | ○ | Higher than 170° C. |

TABLE 4-continued

|  | (1) Tensile test | (2) Drop impact test | (3) Heat cycle test | (4) Liquidus temperature measurement |
|---|---|---|---|---|
| Comparative Example 3 | Δ | Δ | Δ | Higher than 170° C. |
| Comparative Example 4 | X | X | X | 170° C. or lower |
| Comparative Example 5 | X | X | Δ | 170° C. or lower |
| Comparative Example 6 | X | X | ⊙ | 170° C. or lower |
| Comparative Example 7 | Δ | Δ | X | 170° C. or lower |
| Comparative Example 8 | X | X | ⊙ | 170° C. or lower |
| Comparative Example 9 | Δ | Δ | X | 170° C. or lower |
| Comparative Example 10 | Δ | Δ | X | 170° C. or lower |
| Comparative Example 11 | Δ | Δ | X | 170° C. or lower |
| Comparative Example 12 | Δ | Δ | X | 170° C. or lower |
| Comparative Example 13 | Δ | Δ | X | 170° C. or lower |
| Comparative Example 14 | Δ | Δ | X | 170° C. or lower |
| Comparative Example 15 | Δ | Δ | X | 170° C. or lower |
| Comparative Example 16 | Δ | Δ | X | 170° C. or lower |
| Comparative Example 17 | Δ | Δ | X | 170° C. or lower |

As described above, since the solder alloy of the present example contains predetermined amounts of Bi, Sb, In, and Sn, a joint portion showing good results can be formed in any of (1) the tensile test, (2) the drop impact test, and (3) the heat cycle test while lowering the liquidus temperature.

Here, the strain rate when an automobile collides with an object is said to be $10^{-3}(s^{-1})$ to $10^3(s^{-1})$. In the tensile test (1), since a test piece having a GL0 of 12 mm is pulled with a stroke of 0.72 mm/min, the strain rate is $10^{-3}(s^{-1})$.

As described above, it can be seen that the solder alloy of the present example can form a joint portion having good resistance, that is, good strength and ductility even when a load comparable to the strain rate when an automobile collides with an object is applied.

As described above, the solder alloy of the present example can form a highly reliable joint portion having excellent heat cycle resistance and drop impact resistance. In addition, the electronic control device and the electronic device having such a joint portion can exhibit high reliability.

In addition, the solder alloy of the present example can have a liquidus temperature of 170° C. or lower, and thus can suppress joining failure even in reflow at a peak temperature of 185° C.

Obviously, numerous modifications and variations of the present invention are possible in light of the above teachings. It is therefore to be understood that within the scope of the appended claims, the invention may be practiced otherwise than as specifically described herein.

What is claimed is:
1. A solder alloy consisting of:
45 mass % or more and 63 mass % or less of Bi;
0.1 mass % or more and less than 0.7 mass % of Sb;
0.05 mass % or more and 1 mass % or less of In; and optionally one or more selected from P, Ga, and Ge in a total amount of 0.001 mass % or more and 0.05 mass % or less;

optionally one or more selected from Mn, Ti, Al, Cr, V, and Mo in a total amount of 0.001 mass % or more and 0.05 mass % or less; and a balance including Sn.

2. The solder alloy according to claim 1, wherein a liquidus temperature of the solder alloy is 170° C. or lower.

3. A joining material comprising:

a solder alloy consisting of:

45 mass % or more and 63 mass % or less of Bi;

0.1 mass % or more and less than 0.7 mass % of Sb;

0.05 mass % or more and 1 mass % or less of In;

optionally one or more selected from P, Ga, and Ge in a total amount of 0.001 mass % or more and 0.05 mass % or less;

optionally one or more selected from Mn, Ti, Al, Cr, V, and Mo in a total amount of 0.001 mass % or more and 0.05 mass % or less; and a balance including Sn.

4. The joining material according to claim 3, wherein a liquidus temperature of the solder alloy is 170° C. or lower.

5. A solder paste comprising:

a flux; and a powder made of a solder alloy consisting of:

45 mass % or more and 63 mass % or less of Bi;

0.1 mass % or more and less than 0.7 mass % of Sb;

0.05 mass % or more and 1 mass % or less of In; and optionally one or more selected from P, Ga, and Ge in a total amount of 0.001 mass % or more and 0.05 mass % or less;

optionally one or more selected from Mn, Ti, Al, Cr, V, and Mo in a total amount of 0.001 mass % or more and 0.05 mass % or less; and a balance including Sn.

6. The solder paste according to claim 5, wherein a liquidus temperature of the solder alloy is 170° C. or lower.

7. A joint portion formed using the solder alloy according to claim 1.

8. A joint portion formed using the joining material according to claim 3.

9. A joint portion formed using the solder paste according to claim 5.

10. A joint structure comprising:

a first joining target material;

a second joining target material; and a joint portion formed using the solder alloy according to claim 1 to join the first joining target material and the second joining target material.

11. A joint structure comprising:

a first joining target material;

a second joining target material; and a joint portion formed using the joining material according to claim 5 to join the first joining target material and the second joining target material.

12. A joint structure comprising:

a first joining target material;

a second joining target material; and a joint portion formed using the solder paste according to claim 5 to join the first joining target material and the second joining target material.

13. An electronic control device comprising:

a joint structure comprising:

a first joining target material;

a second joining target material; and a joint portion formed using the solder alloy according to claim 1 to join the first joining target material and the second joining target material.

14. An electronic control device comprising:

a joint structure comprising:

a first joining target material;

a second joining target material; and a joint portion formed using the joining material according to claim 3 to join the first joining target material and the second joining target material.

15. An electronic control device comprising:

a joint structure comprising:

a first joining target material;

a second joining target material; and a joint portion formed using the solder paste according to claim 5 to join the first joining target material and the second joining target material.

* * * * *